3,284,470
OCTAHYDROPHENANTHRENETETRACARBOX-
YLIC ACIDS, ANHYDRIDES, ESTERS AND THE
PROCESS OF THEIR PREPARATION
Hugh A. Farber, Midland, Mich., assignor to The Dow
Chemical Company, Midland, Mich., a corporation of
Delaware
No Drawing. Filed June 21, 1965, Ser. No. 465,709
12 Claims. (Cl. 260—346.3)

The present invention relates to new chemical compounds and to a novel reaction whereby these compounds are obtained. It is particularly concerned with new Diels-Alder adducts of maleic acid compounds with divinylbenzene and diisopropenylbenzene.

It is known that maleic anhydride reacts with styrene or isopropenylbenzene in a Diels-Alder type of addition to form a 1:1 adduct having a fused ring structure. The final product retains the benzenoid ring of the styrene reactant.

It has now been found that this general type of reaction can be extended to the formation of an adduct wherein two molecules of maleic anhydride or other maleic acid compound are reacted with a molecule of divinylbenzene or diisopropenylbenzene to make a tricyclic tetracarboxylic dianhydride or corresponding acid compound, which in at least some cases has an octahydrophenanthrene nucleus. Whereas the known reaction described above yields a product which retains the aromatic ring of the starting styrene, this new reaction produces a fused ring structure which is partially saturated throughout and no benzenoid ring remains. The present reaction has been found to take place between the meta and para isomers of divinylbenzene and diisopropenylbenzene as the diene and a maleic acid compound as the dienophile reactant. By the term maleic acid compound here and in the appended claims is meant maleic anhydride, maleic acid, and alkyl esters of maleic acid wherein alkyl is of 1–8 carbon atoms. The product obtained from the meta dialkenylbenzene has been found to have the general structure.

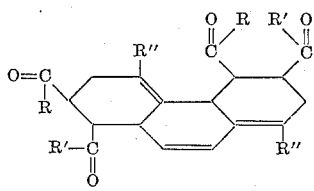

That obtained by reaction of the para isomer is believed to have a similar structure, corresponding to the formula

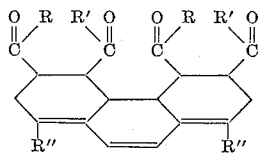

In each of the above formulas, R and R' when taken separately are hydroxyl or alkoxy of 1–8 carbon atoms and when taken together, R and R' constitute an oxygen atom, and R'' is hydrogen or methyl.

These compounds are obtained by reacting about two moles or slightly more, preferably 2–2.5 moles, of maleic anhydride with a mole of the divinylbenzene or diisopropenylbenzene at about 100–250° C., conveniently in the presence of an inert solvent. Aromatic hydrocarbon solvents such as xylene, ethylbenzene, and mesitylene are preferred. The dianhydride product is relatively insoluble and it is easily separated by filtering the precipitated material from the cooled reaction mixture. The product is readily purified by recrystallization.

The dianhydride products are white crystalline substances of relatively high melting point, slightly soluble in aromatic hydrocarbons, moderately soluble in acetone. They are slowly hydrolyzed in water to the free tetracarboxylic acids. The hydrolysis is accelerated by the presence of sodium hydroxide or other such base. Derivatives such as the free acid and esters are preferably made by conventional hydrolysis or esterification procedures from the anhydride. These derivatives can also be made directly by using maleic acid or a maleic ester as the dienophile reactant in place of maleic anhydride in the above-described reaction.

Mixed products are obtained by reacting maleic anhydride or other maleic acid compound with mixtures of meta and para dialkenylbenzenes as described above. Since the meta and para isomers react at about the same rate, the isomer distribution in such a mixed product is substantially that of the starting dialkenylbenzene mixture.

These new compounds are useful as contact herbicides and are effective against broadleaf weeds when applied as aqueous emulsions in conventional concentrations. The alkyl esters are also useful as very high boiling plasticizers suitable for compounding with resins such as polyvinyl chloride and cellulose ethers. The acid and anhydride forms are particularly useful as intermediates for the preparation of aromatic polyamide resins by reaction with diamines such as oxydianiline and methylenedianiline. The resulting polyamides are hard, heat and solvent resistant materials which are useful as wire coatings.

*Example 1*

A solution of 196 g. of maleic anhydride and 158 g. of m-diisopropenylbenzene in 600 ml. of xylene was made up in a one-liter reaction flask and stirred at reflux temperature for four hours. After one hour of heating, a white particulate solid began to separate from the solution. A semi-solid mush of crystals was obtained by cooling the reaction mixture to room temperature. The solid was separated by vacuum filtration and dried to obtain 238 g. of a light yellow solid. The filtrate was heated an additional six hours at reflux, then concentrated and cooled to precipitate an additional 77.5 g. of light tan powder which was added to the first crop of product.

A 115 g. portion of the product was extracted with 500 ml. of acetone in a Soxhelt extraction for a total of 26 hours. Cooling of the resulting acetone solution yielded a total of 79.5 g. of off-white powder having a melting point of 251–256° C. and a neutral equivalent of 88.8. Upon recrystallization of this material from acetone, a white crystalline powder was obtained, melting point 255–256° C. with some decomposition. The neutral equivalent of this product and analyses by nuclear magnetic resonance measurement and various types of spectroscopic examination showed the product to be 1,2,3,4b,5, 6,7,10a-octahydro-4,8-dimethyl-1,2,5,6 - phenanthrenetetracarboxylic dianhydride, which compound has the formula

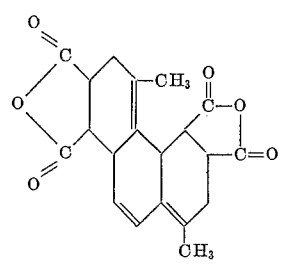

The dianhydride product was only slightly soluble in xylene, moderately soluble in actone. It hydrolyzed slowly viscous liquid of very high boiling point, moderately carboxylic acid, a white crystalline solid which decomposed at about 300° C. More rapid hydrolysis with aqueous NaOH yielded the tetrasodium salt of the acid.

Portions of the product dianhydride were reacted respectively with n-butanol and with isoheptyl alcohol by standard esterification procedure using sulfuric acid as the catalyst to make the tetrabutyl and the tetraisoheptyl esters. These esters were thick viscous liquids.

Example 2

Diethyl maleate was reacted with m-diisopropenylbenzene according to the procedure described in Example 1. The product was tetraethyl 1,2,3,4b,5,6,7,10a-octahydro-4,8-dimethyl-1,2,5,6-phenanthrenetetracarboxylate, a highly viscous liquid of very high boiling point, moderately soluble in most organic solvents.

Example 3

Maleic anhydride was reacted with m-divinyl-benzene in the manner shown in Example 1. The product was the homologous dianhydride, 1,2,3,4b,5,6,7,10a-octahydro-1,2,5,6-phenanthrenetetracarboxylic dianhydride having a formula as shown in Example 1 but lacking the two ring methyl groups. This compound, when purified, is a white crystalline solid with chemical and physical properties closely similar to those of the homologous dianhydride shown above. The neutral equivalent of the recrystallized compound was found to be 81.8, calc. 81.5. It melted with decomposition above 300° C.

Example 4

Maleic anhydride was reacted in 2:1 molar proportion with p-diisopropenylbenzene as shown in Example 1 to form as the diadduct an octahydrodimethylphenanthrenetetracarboxylic dianhydride, this compound having the probable formula

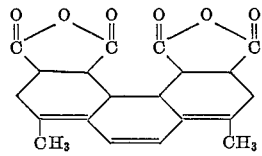

The properties of the product are similar to those of the isomeric dianhydride of Example 1.

Example 5

In the manner of Example 4, maleic anhydride and p-divinylbenzene were reacted in 2:1 molar proportion to form the corresponding homologous octahydrophenanthrenetetracarboxylic dianhydride, a white crystalline solid having properties closely similar to those of the above-described anhydrides.

The free acids corresponding to the dianhydrides of Examples 3–5 and the esters and salts thereof are easily prepared by methods such as described after Example 1.

Since divinylbenzene is ordinarily available as a mixture of the meta and para isomers, adducts of this dialkenylbenzene are preferably made using such a mixture. The mixed products thereby obtained have essentially the same properties and are useful for the same purposes as the pure isomers. The preparation of such mixed products is illustrated by Example 6.

Example 6

A mixture of 0.27 g. mole of crude divinylbenzenes containing the metal and para isomers in about 70:30 ratio with 1.36 g. moles of maleic anhydride was heated in 125 g. of toluene at 120° C. for 1.5 hours. The white solid which had separated from the refluxing solution during the heating period was filtered, washed with hot toluene, and dried to obtain about 90 g. of an off-white powder. The product was essentially a mixture of the isomeric dianhydride products of Examples 3 and 5. A portion purified by dissolving in hot dimethylformamide and adding water to cause precipitation melted at 280–300° C. with some decomposition. It was very slightly soluble in acetone and slightly soluble in dimethylformamide.

The tetrabutyl ester of this mixed product was prepared by reacting it with excess 1-butanol in the presence of a little sulfuric acid as the esterification catalyst. The ester was a viscous liquid which was compatible with polyvinyl chloride.

Example 7

A solution of 5 parts by weight of p,p'-oxydianiline and 8.8 parts of the dianhydride product of Example 1 in 50 parts of dimethylformamide was maintained at 48–52° C. for 17 hours. A film was prepared on a NaCl plate by removing solvent from the resulting reaction mixture at 50° C. under reduced pressure. Infrared analysis of the film indicated very little residual anhydride and a strong amide carbonyl bond. Baking this film at 350° F. for one hour showed imide formation and after an additional hour at 400° F., a very hard glossy brown coating was obtained. This coating was resistant to most common organic solvents.

I claim:
1. A compound having ones of the formulas

I.

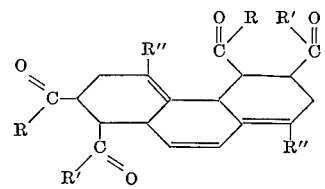

and

II.

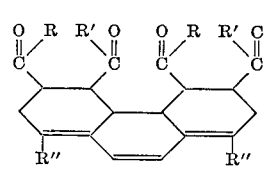

wherein R and R' when taken separately are hydroxy or alkoxy of 1–8 carbon atoms and when taken together R and R' constitute an oxygen atom, and wherein R" is hydrogen or methyl.

2. The compound of claim 1 having Formula II.
3. The compound of claim 1 having Formula II wherein R and R' are taken together to constitute an oxygen atom and R" is hydrogen.
4. The compound of claim 1 having Formula II wherein R and R' are taken together to constitute an oxygen atom and R" is methyl.
5. A compound having the formula

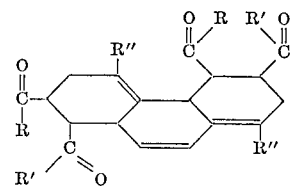

wherein R and R' when taken separately are hydroxyl or alkoxy of 1–8 carbon atoms and when taken together, R and R' constitute an oxygen atom, and wherein R" is hydrogen or methyl.

6. 1,2,3,4b,5,6,7,10a - octahydro - 4,8-dimethyl-1,2,5,6-phenanthrenetetracarboxylic dianhydride.
7. 1,2,3,4b,5,6,7,10a - Octahydro - 4,8-dimethyl-1,2,5,6-phenanthrenetetracarboxylic acid.
8. Tetrabutyl 1,2,3,4b,5,6,7,10a-octahydro-4,8-dimethyl-1,2,5,6-phenanthrenetetracarboxylate.
9. Tetraisoheptyl 1,2,3,4b,5,6,7,10a-octahydro-4,8,-dimethyl-1,2,5,6-phenanthrenetetracarboxylate.

10. 1,2,3,4b,5,6,7,10a-octahydro-1,2,5,6-phenanthrene-tetracarboxylic dianhydride.

11. A process for making the compound of claim 1 which comprises reacting by contacting at least about two moles of a maleic acid compound with a mole of at least one of the compounds m-divinylbenzene, p-divinylbenzene, m-diisopropenylbenzene and p-diisopropenyl benzene in liquid phase at a temperature of 100–250° C.

12. The process of claim 11 wherein the maleic acid compound is maleic anhydride.

No references cited.

ALEX MAZEL, *Primary Examiner.*

JAMES H. TURNIPSEED, *Assistant Examiner.*